June 23, 1970     D. L. REXFORD     3,516,605

FLUIDIC MULTIPLIER CIRCUIT

Filed Nov. 1, 1968

INVENTOR:
DONALD L. REXFORD, by Louis A. Moucha

United States Patent Office 3,516,605
Patented June 23, 1970

3,516,605
FLUIDIC MULTIPLIER CIRCUIT
Donald L. Rexford, Schenectady, N.Y., assignor to General Electric Company, a corporation of New York
Filed Nov. 1, 1968, Ser. No. 772,616
Int. Cl. G06d 1/12
U.S. Cl. 235—200　　　　　　　　　　　　　　12 Claims

ABSTRACT OF THE DISCLOSURE

A fluidic circuit for providing a pressurized analog output signal representing the product of two pressurized analog input signals includes a pulse width modulator circuit, a pulse height modulator circuit and a filter circuit for obtaining an average of the output pulses. The pulse height modulator is comprised of digital type fluid amplifiers and the pulse width modulator circuit is comprised of digital amplifiers and an integrator.

My invention relates to a fluidic multiplier circuit having no moving mechanical parts, and in particular, to a circuit for generating a series of pressurized pulses wherein the width of the pulses is directly proportional to one of the input variables and the height is directly proportional to the other input variable.

Various computing functions including multiplication are required in many control system applications as well as in conventional computers. Electronic multipliers are available, however, in the case of fluidic applications the use of an electronic component would require the expense in money and space for suitable transducers to convert the fluidic signal to an electronic signal and vice versa. No suitable fluidic multiplier having no mechanical parts to thereby obtain an inherent reliability have previously been known.

Therefore, one of the principal objects of my invention is to provide a fluidic multiplier having no moving mechanical parts.

Another object of my invention is to provide a fluidic multiplier of simple construction and high reliability.

Briefly summarized, my invention is a fluidic multiplier circuit which comprises a pulse width modulator circuit for generating a series of pressurized fluid pulses having a width directly proportional to the magnitude of a first input variable, and a fluidic pulse height modulator circuit for varying the amplitude of the pulses in direct proportion to the magnitude of a second input variable. A fluidic filter network obtains an average pressure value for the series of pulses which is proportional to the product of the two input variables.

The features of my invention which I desire to protect herein are pointed out with particularity in the appended claims. The invention itself, however, both as to its organization and method of operation, together with further objects and advantages thereof may best be understood by reference to the following description taken in connection with the accompanying drawings wherein:

Figure 1:
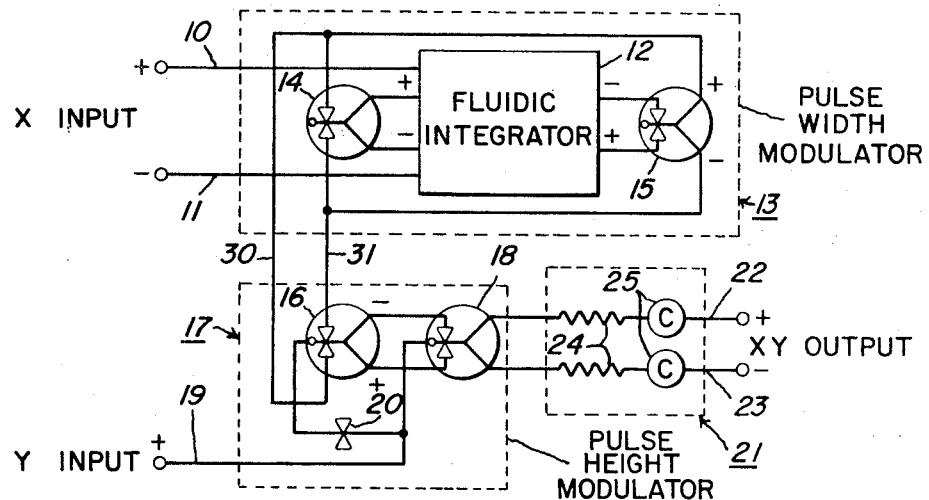
FIG. 1 is a schematic representation of a fluidic multiplier circuit constructed in accordance with my invention and adapted for multiplying a differential pressurized first input variable and a single-ended pressurized second input variable.

Referring now in particular to FIG. 1, there is shown a schematic representation of a fluidic multiplier circuit constructed in accordance with my invention and adapted for obtaining the mathematical product of a first input variable designated X and a second input variable designated Y. In this particular embodiment, the X input variable is an analog type fluid pressurized signal which is differential (push-pull) pressurized and supplied to the input fluid flow passages (lines) 10, 11. The fluid utilized in the X and Y input signals is preferably, though not necessarily, of the same type, and may be a gas such as air or liquid such as water. Passage 10 is designated as the positive polarity line and passage 11 as the negative polarity line, it being understood that one end of the input signal X may be below ambient pressure. The designated X input polarities are merely a convenient means for indicating related polarities throughout the multiplier circuit, and are not restrictive as to the polarity of the signal in the input lines. The input lines 10 and 11 are connected to a first pair of inputs of a fluidic integrator circuit 12 which may be of the type described in a co-pending patent application, S.N. 752,098 entitled "High Signal-to-Noise Fluid Amplifier and Fluidic Components," inventor T. F. Urbanosky, and assigned to the assignee of the present invention. The fluidic integrator is comprised of an odd number of analog type fluid amplifiers and passive type fluid flow resistive and reactive elements for producing the mathematical integrating function and has no moving mechanical parts. Integrator 12 forms an element of a pulse width modulator circuit designated as a whole by numeral 13 and shown enclosed by the dashed lines. The pulse width modulator further includes an input fluidic flip-flop element 14 and an output fluidic flip-flop element 15. Each of elements 14 and 15 comprises an active type digital fluid amplifier employing the wall attachment phenomenon to obtain a memory function whereby the power jet is directed exclusively to one receiver in response to a first control input signal and is switched to the other receiver in response to a second control input signal in accordance with conventional digital fluid amplifier operation. The power fluid supplied to elements 14, 15 is also preferably of the same type as utilized in the X and Y input signals. The two receivers of input flip-flop 14 are in fluid communication with a second pair of inputs of integrator 12, and the output of the integrator is applied to the control nozzle inputs of output flip-flop 15. The output of flip-flop 15 is connected to the control nozzle inputs of input flip-flop 14 and also to the control nozzle inputs of a first stage flip-flop 16 to be hereinafter described in greater detail.

The output of the pulse width modulator 13 is applied to the input of the pulse height modulator circuit designated as a whole by numeral 17 and comprising a two stage flip-flop circuit. Each of the two stages 16 and 18 are of the same structure as flip-flops 14 and 15 except that they are of the passive type in that the power fluid nozzles thereof are not continually supplied from a source of pressurized power fluid as in the case of flip-flops 14 and 15. In particular, the power nozzle of flip-flop 18 is supplied with the second input variable Y through input line 19. The Y input variable is also an analog type fluid pressurized signal, but of the single-ended type wherein the single ended type is one in which the pressure is measured relative to ambient. Since the Y input signal provides the power fluid to elements 16 and 18, any nonzero value thereof must be pressurized above ambient. Flip-flops 16 and 18 are serially connected and in accordance with the normal practice of providing a higher power fluid supply pressure to the second stage, a fluid flow restrictor 20 is inserted in the line between the power nozzle of flip-flop 16 and the Y input signal line 19. Alternatively, flip-flop 16 may be of the active type and the Y input variable is supplied only to the second stage flip-flop 18. The output of the receivers of flip-flop 16 are connected to the control nozzle inputs of flip-flop 18. A fluidic averaging circuit designated as a whole by numeral 21 is connected to the output of the pulse height modulator and comprises a low pass filter in each of the two output lines 22 and 23 of my multiplier circuit. As one example, each low pass filter may comprise a fluid flow restrictor R which functions as a fluidic resistor 24 to provide a fluid flow resistance, and a fixed volume C which functions as a fluidic capacitor 25 to provide a fluid flow capacitance. Thus, each low pass filter may be of the RC type, as illustrated, wherein corresponding elements are of equal size. Alternatively, each of the low pass filters may comprise an LC circuit wherein the inductance L is comprised of a long thin tubing.

Figure 2:
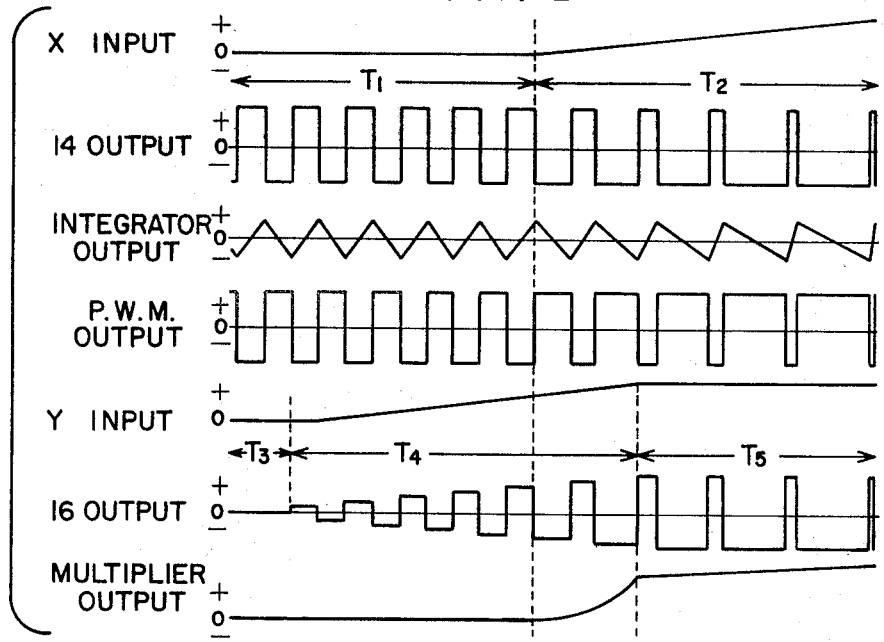
FIG. 2 is a graphical representation of the operation of my multiplier illustrating the wave forms of various pressurized fluid signals in my circuit versus time.

The operation of the embodiment of my fluidic multiplier circuit illustrated in FIG. 1 will now be explained with reference to the wave forms of fluid-pressurized signals in the various parts of the circuit as illustrated in FIG. 2. It will be assumed that the X input signal is zero during a first time interval $T_1$, that is, the differential pressure between input lines 10 and 11 is zero, and that during a second time interval $T_2$, the X input signal is a positive differential pressurized ramp function wherein the pressure in line 10 is linearly increasing with respect to the pressure in line 11. Thus, during time interval $T_1$, the only signal applied to integrator 12 is from the output of flip-flop 14. During time interval $T_1$, the two outputs of element 14 form two pulse trains of square wave pulses, the pulses being of equal amplitude (height) and equal time duration (width) and indicated as 14 OUTPUT in FIG. 2. The square wave pulses described herein are not limited to square shapes and include rectangular shapes. The positive (+) pulses represent the output at the + receiver of flip-flop 14 and the negative (−) pulses the output at the − receiver. Under this condition, integrator 12 is caused to integrate at a constant rate in a positive polarity going direction (at the + output terminal relative to the − output terminal) during the positive pulse time at the output of flip-flop 14. At the end of each positive pulse at the output of element 14, the output pressure of integrator 12 is sufficient to switch the power jet in flip-flop 15 from the − receiver to the + receiver thereof which thereby switches the state of flip-flop 14. In like manner, integrator 12 is caused to integrate at the same constant rate, but in a negative polarity going direction (integrates positively at the − output terminal relative to the + terminal) during the negative pulse time of flip-flop 14, and at the end of the negative pulse, the output pressure of integrator 12 is sufficient to switch the state of flip-flop 15 and thereby switch the state of flip-flop 14. Thus, the two outputs of the pulse width modulator (PWM) form two pulse trains of square wave pulses, each pulse being of equal height and equal width during time interval $T_1$, and the combined pulse train indicated as PWM OUTPUT in FIG. 2 is the inverse of the combined pulse train at the outputs of flip-flop 14 (14 OUTPUT).

The output of the pulse width modulator may also be described in terms of the single-ended signal developed in only one of its output lines 30, 31. In this latter case the output of the pulse width modulator in line 30 during time interval $T_1$ is a pulse train of square wave pulses, each pulse of equal height and equal width wherein the pulse width is equal to the spacing between adjacent pulses. In either case, it is recognized that there is a very small time increment between the related change in state of the outputs of flip-flops 15 and 14, however, the width of each pulse is sufficiently great that such difference between the switching times of flip-flops 15 and 14 can be neglected.

During the time interval $T_2$, the increasing pressure magnitude of the positive polarity X input signal is applied across input lines 10 and 11 causing integrator 12 to integrate at a faster rate in the positive polarity going direction and at a slower rate in the negative polarity going direction compared to time interval $T_1$, as indicated by the wave forms INTEGRATOR OUTPUT in FIG. 2 since the net control input signal to integrator 12 is the summation of the X input signal and the output of flip-flop 14. This difference in integrating rates causes the time interval for integrator 12 to achieve the switching control pressure level for flip-flop 15 to be reduced and increased when integrating in the positive and negative polarity going directions, respectively. This difference in integrating time intervals causes flip-flop 15 (and therefore also flip-flop 14) to successively switch its states at unequal time increments resulting in the output of the pulse width modulator in line 30 being a pulse train of square wave pulses each of equal height, but of width varying in direct proportion to the magnitude of the analog X input signal. The output of the pulse width modulator in line 31 is obviously a pulse train having pulses of width varying inversely with the magnitude of the X input signal. In like manner, when the analog X input signal is of negative polarity (pressure in line 11 is greater than in line 10), the output of the pulse width modulator in line 30 is a pulse train comprising a series of equal height square wave pulses whose widths vary inversely with the magnitude of the analog X input signal.

The output of the pulse width modulator is supplied to the control input nozzles of flip-flop 16 in the pulse height modulator circuit 17. Thus, a change in the output state of flip-flop 15 causes a change in the state of flip-flop 16. However, the power fluid supplied to flip-flops 16 and 18 is from the analog Y input signal source and thus in the absence of a Y input signal, there is no output in either of flip-flops 16 and 18. Assume that for a first time interval $T_3$ the Y input signal is zero, during a second time interval $T_4$ the Y input signal is a ramp function wherein the pressure in line 19 is linearly increasing, and during a third time interval $T_5$ the Y input signal is maintained at a constant positive pressure magnitude. Thus, during the time interval $T_3$, there is no output from flip-flops 16 and 18 and thus the multiplier output XY remains zero in the output lines 22 and 23.

In some applications, the pulse height modulator 17 may comprise only a single stage flip-flop, however, it has been found convenient to employ two stages in order to reduce second order effects at low values of the Y input signal. Since the pressure of the Y input signal determined the magnitude of power fluid flow to the flip-flops in the pulse height modulator, the effect on the pulse height modulator 17 on the pulse train supplied from the output of the pulse width modulator 13 is to vary the amplitude (height) of the pulses thereof (but not the width) in direct proportion to the magnitude of the Y input signal. This effect may be noted in the pulse wave forms designated 16 OUTPUT in FIG. 2 which represent the output of flip-flop 16. Thus, in the time interval $T_1-T_3$, the two outputs of flip-flop 16 form two pulse trains of square wave pulses, each pulse being of equal width and of height in direct proportion to the increasing magnitude of the Y input signal. The variation in pressure magnitude of the Y input signal is assumed to be sufficiently slow relative to the pulse rate at the output of digital element 16 that for all practical purposes each pulse has a constant amplitude. The output of flip-flop 18 is the inverse of the output of flip-flop 16, and is transmitted through the averaging circuit 21 in the output lines 22, 23 such that the multiplier output XY remains zero during the $T_1-T_3$ time interval wherein the pulses are of equal width.

During the time interval $T_3+T_4-T_1$ wherein the X and Y input signals are both increasing in magnitude, the outputs of flip-flop 18 comprise a (positive) pulse train of pulses having increasing widths and increasing heights and a (negative) pulse train of pulses having decreasing widths and increasing heights. The output of flip-flop 16 is, of course, the inverse of the output of flip-flop 18. The averaging circuit 21 in effect averages the areas under the two pulse trains at the output of flip-flop 18 and thus during time interval $T_3+T_4-T_1$ the average value thereof is a nonlinearly increasing pressure magnitude as indicated by the wave form of the multiplier output in FIG. 2.

In the last time interval $T_5$, the Y input variable remains at a constant magnitude and only the X input variable is still increasing at a constant rate. Thus, the pulses at the output of flip-flop 18 have equal heights, but the widths continue varying in proportion to the magnitude of the X input signal. The increase in the widths of the (positive) pulses at the output of flip-flop 18 causes a multiplier output having a constant rate of rise corresponding to the rate of rise of the magnitude of the X input signal. It should be noted that the multiplier output XY is sensitive to the polarity of the X input signal, and thus if the X input signal was negative (the pressure in input line 11 greater than the pressure in input line 10), the multiplier output polarity would also be negative (the pressure in line 23 greater than the pressure in line 22). In all cases, the amplitude of the differential output across lines 22, 23 is directly proportional to the product of the magnitudes of the X and Y input signals.

In the case wherein flip-flop 16 is of the active type (constantly supplied with power fluid) and only flip-flop 18 is supplied with the Y input signal, the output of flip-flop 16 would be the inverse of the output of flip-flop 15 but the output of flip-flop 18 would still be the inverse of the output of flip-flop 16 illustrated in FIG. 2.

Figure 3:
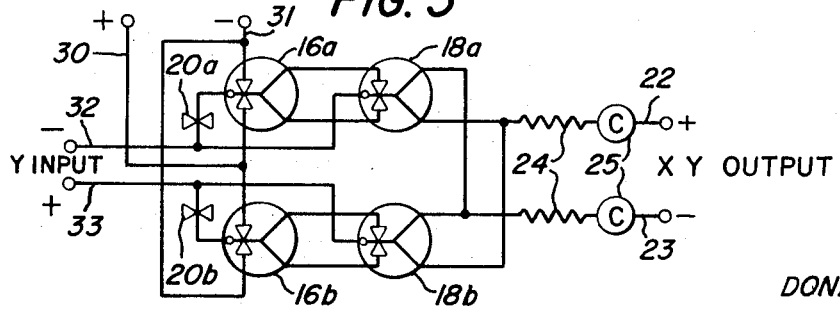
FIG. 3 is a schematic representation of the multiplier circuit illustrated in FIG. 1 but adapted for use with a differential pressurized second input variable.

FIG. 3 illustrates the pulse height modulator and averaging circuit components of my multiplier circuit in an embodiment adapted for use with a double-ended (differential pressurized) analog type Y input variable signal. Since the Y input signal is the supply for the power fluid inlet of the digital fluid amplifiers in the pulse height modulator, or at least for the second stages 18a, 18b thereof, both ends of such signal must be above ambient pressure. As in the case of the FIG. 1 embodiment, the two outputs of the pulse width modulator are supplied to the pulse height modulator through passages 30 and 31 wherein passage 30 is connected to the + output of the pulse height modulator and passage 31 to the − output. Passage 30 is connected to first control nozzles of flip-flops 16a and 16b, and passage 31 is connected to the opposing control nozzles in the respective flip-flops. The outputs of the receivers of flip-flop 16a are connected to the control nozzles of the second stage flip-flop 18a, and the outputs of the receivers of flip-flop 16b are connected to the control nozzles of second stage flip-flop 18b. The power fluid nozzles of flip-flops 16a and 18a are supplied with fluid from the negative polarity Y input signal line 32. A fluid flow restrictor 20a is connected between the power nozzle of flip-flop 16a and line 32 for reducing the pressure of the power fluid supplied thereto. In like manner, the power fluid to flip-flops 16b and 18b is supplied from the positive polarity Y input signal line 33, and a restrictor 20b is connected between line 33 and the power nozzle of flip-flop 16b. The outputs of the receivers of second stage flip-flops 18a and 18b are interconnected as illustrated such that output line 22 provides the multiplier positive polarity XY output and line 23 the negative polarity output for X and Y input signals having the polarities indicated in the input lines 10, 11 and 32, 33. As in the case of the FIG. 1 embodiment, it may be possible in some applications to omit the second stage flip-flops 18a and 18b in the FIG. 3 embodiment.

It is apparent from the foregoing that my invention attains the objectives set forth in that it provides a fluidic multiplier of simple construction and high reliability due to the no moving mechanical parts feature. The appended claims are intended to cover the scope of my invention.

What I claim as new and desire to secure by Letters Patent of the United States is:

1. A fluidic multiplier circuit having no moving mechanical parts and comprising:
   fluidic pulse width modulator means for converting a first differential pressurized analog input signal to a pair of pulse trains of pressurized square wave pulses characterized by the pulse widths thereof being equal when the differential pressure of the first analog input signal is zero and the pulse widths of the pulses in the first and second pulse trains varying respectively in direct proportion to and inversely with the magnitude of the first analog input signal when the differential pressure of the first analog input signal is not zero,
   fluidic pulse height modulator means in communication with the output of said pulse width modulator means for varying the height of the pulses in each pair of pulse trains in direct proportion to the magnitude of a second pressurized analog input signal, and
   fluidic low pass filter means in communication with the output of said fluidic pulse height modulator means for providing a differential pressurized analog output representing the average pressure of the output of said pulse height modulator means, the average pressure being directly proportional to the product of the first and second analog input signals.

2. A fluidic multiplier circuit comprising:
   first means for generating a series of pressurized square wave pulses each having an equal amplitude and time duration varying in direct proportion to the magnitude of a first input variable,
   second means in communication with the output of said first means for varying the amplitude of the square wave pulses in direct proportion to the magnitude of a second input variable, and
   means in communication with the output of said second means for obtaining an average pressure value for the series of square wave pulses at the output of said second means, the average pressure value being directly proportional to the product of the two input variables.

3. The fluidic multiplier circuit set forth in claim 2 wherein:
   said first means comprises a fluidic pulse width modulator circuit having no moving mechanical parts.

4. The fluidic multiplier circuit set forth in claim 2 wherein:
   said second means comprises a pulse height modulator circuit having no moving mechanical parts.

5. The fluidic multiplier circuit set forth in claim 2 wherein:
   said first means comprises a fluidic pulse width modulator circuit having no moving mechanical parts,
   said second means comprises a fluidic pulse height modulator circuit having no moving mechanical parts, and
   said averaging means comprises a fluidic low pass filter network having no moving mechanical parts, 6. The fluidic multiplier circuit set forth in claim 5 wherein:
   said fluidic pulse width modulator circuit comprises a fluidic integrator and a pair of digital type fluid amplifiers.

7. The fluidic multiplier circuit set forth in claim 6 wherein:
   said pair of digital fluid amplifiers are each of the active type,
   the first input variable comprising a differential pressurized signal of the analog type and supplied to a first pair of inputs of said fluidic integrator,
   the outputs of a first of said pair of digital fluid amplifiers connected to a second pair of inputs of said fluidic integrator,
the outputs of said fluidic integrator connected to the control fluid inputs of the second of said pair of digital fluid amplifiers.
the outputs of said second digital fluid amplifier connected to the control fluid inputs of said first digital amplifier and also to the inputs of said pulse height modulator circuit.

8. The fluidic multiplier circuit set forth in claim 7 wherein:
said pulse height modulator circuit comprises at least one digital type fluid amplifier.

9. The fluidic multiplier circuit set forth in claim 8 wherein:
the digital fluid amplifier in said pulse height modulator circuit is of the passive type, the power fluid input thereof being supplied with an analog type pressurized signal representing the second input variable.

10. The fluidic multiplier circuit set forth in claim 7 wherein:
said pulse height modulator circuit comprises two stages of serially connected digital type fluid amplifiers, the power fluid input of at least the second stage amplifier being supplied with a single-ended pressurized signal of the analog type representing the second input variable, the output of said pulse width modulator circuit connected to the control fluid inputs of the first stage amplifier in said pulse height modulator circuit and the output of the second stage amplifier connected to a pair of output passages each including the fluidic low pass filter comprising a fluidic resistor and capacitor whereby said fluidic multiplier circuit is adapted to provide an output differential pressure directly proportional to the product of two input variables one of which is characterized by a single-ended pressure signal of the analog type and the other by a differential pressurized signal of the analog type.

11. The fluidic multiplier circuit set forth in claim 9 wherein:
said fluidic low pass filter network comprises a serially connected fluidic resistor and capacitor in each of the passages connected to the outputs of the digital fluid amplifier in said pulse height modulator circuit.

12. The fluidic multiplier circuit set forth in claim 8 wherein:
said pulse height modulator circuit comprises at least one pair of passive type digital fluid amplifiers, the power fluid input of a first of said pair of passive digital fluid amplifiers connected to a first passage supplied with one end of a differential pressurized signal of the analog type representing the second input variable, the power fluid input of the second of said pair of passive type digital fluid amplifiers connected to a second passage supplied with the second end of the second input variable signal,
a first output of said pulse width modulator circuit connected to first control fluid inputs of said passive digital fluid amplifiers, a second output of said pulse width modulator circuit connected to second control fluid inputs of said passive digital fluid amplifiers, and
first outputs of said passive digital fluid amplifiers connected to a first output passage of the multiplier circuit, and second outputs of said passive digital fluid amplifiers connected to a second output passage, said first and second output passages each including the fluidic low pass filter comprising a fluidic resistor and capacitor whereby said fluidic multiplier circuit is adapted to provide an output differential pressure directly proportional to the product of two input variables each characterized by a differential pressurized signal of the analog type.

References Cited

UNITED STATES PATENTS

| 3,409,032 | 11/1968 | Boothe et al. | 137—81.5 |
| 3,443,574 | 5/1969 | Posingies | 235—201 |
| 3,458,129 | 7/1969 | Woodson | 235—200 |

OTHER REFERENCES

R. W. Warren, "Pulse Duration Modulation," Fluid Amplification Symposium, Diamond Ordnance Fuze Laboratories, Washington, D.C., October 1962, pp. 41–45.

RICHARD B. WILKINSON, Primary Examiner

L. R. FRANKLIN, Assistant Examiner